US012124962B2

(12) United States Patent
Barroso Laguna et al.

(10) Patent No.: US 12,124,962 B2
(45) Date of Patent: Oct. 22, 2024

(54) FEATURE DETECTOR AND DESCRIPTOR (71) Applicant: HUAWEI TECHNOLOGIES CO., LTD., Guangdong (CN)

(72) Inventors: Axel Barroso Laguna, London (GB); Yannick Verdie, Toronto (CA); Benjamin Busam, London (GB); Ales Leonardis, London (GB); Gregory Slabaugh, London (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 370 days.

(21) Appl. No.: 17/726,684

(22) Filed: Apr. 22, 2022

(65) Prior Publication Data
US 2022/0245922 A1 Aug. 4, 2022

Related U.S. Application Data (63) Continuation of application No. PCT/EP2019/078859, filed on Oct. 23, 2019.

(51) Int. Cl.
*G06N 3/088* (2023.01)
*G06V 10/25* (2022.01)
(Continued)

(52) U.S. Cl.
CPC ............ *G06N 3/088* (2013.01); *G06V 10/25* (2022.01); *G06V 10/454* (2022.01);
(Continued)

(58) Field of Classification Search
CPC ........ G06V 10/40; G06V 20/10; G06V 20/40; G06F 16/5854; G06Q 30/08; G06Q 30/02
See application file for complete search history.

(56) References Cited

U.S. PATENT DOCUMENTS 6,711,293 B1    3/2004  Lowe
7,657,100 B2 *  2/2010  Gokturk ............... G06Q 30/08
                                                        382/209
(Continued)

FOREIGN PATENT DOCUMENTS

CN    102844771 B    8/2015
CN    108447082 A    8/2018
(Continued)

OTHER PUBLICATIONS

Georgios Georgakis et al, End-to-end learning of keypoint detector and descriptor for pose invariant 3D matching, arxiv. org, Cornell University Li Bra Ry, 201 Olin Library Cornell University Ithaca, NY 14853, Feb. 22, 2018 (Feb. 22, 2018), XP081232098, 10 pages.
(Continued)

*Primary Examiner* — Yosef Kassa (57) ABSTRACT

The technology of this application related to an image processor comprising a plurality of modules, the plurality of modules comprising a first module and a second module, wherein the image processor is configured to receive an input image and output a plurality of mathematical descriptors for characteristic regions of the input image. The first module is configured to implement a first trained artificial intelligence model to detect a set of characteristic regions in the input image; and the second module is configured to implement a second trained artificial intelligence model to determine a mathematical descriptor for each of said set of characteristic regions. The first and second trained artificial intelligence models are collectively trained end to end.

20 Claims, 10 Drawing Sheets

(51) Int. Cl.
  *G06V 10/44* (2022.01)
  *G06V 10/46* (2022.01)
  *G06V 10/774* (2022.01)
  *G06V 10/82* (2022.01)

(52) U.S. Cl.
  CPC .......... *G06V 10/462* (2022.01); *G06V 10/774* (2022.01); *G06V 10/82* (2022.01)

(56) References Cited

U.S. PATENT DOCUMENTS

| | | | | |
|---|---|---|---|---|
| 7,672,508 | B2* | 3/2010 | Li | G06T 7/90 382/165 |
| 7,778,786 | B2* | 8/2010 | Ding | G01N 21/8986 209/555 |
| 7,813,822 | B1* | 10/2010 | Hoffberg | H04N 7/163 381/73.1 |
| 7,831,599 | B2* | 11/2010 | Das | G06F 16/5838 382/225 |
| 8,363,973 | B2 | 1/2013 | Liu et al. | |
| 8,732,025 | B2* | 5/2014 | Gokturk | G06Q 30/0623 705/26.1 |
| 9,082,165 | B2* | 7/2015 | Guissin | G06T 7/0012 |
| 2018/0137642 | A1 | 5/2018 | Malisiewicz et al. | |
| 2018/0268256 | A1 | 9/2018 | Di Febbo et al. | |

FOREIGN PATENT DOCUMENTS

| | | | |
|---|---|---|---|
| CN | 108784636 | A | 11/2018 |
| WO | 2007128452 | A3 | 5/2008 |

OTHER PUBLICATIONS

Mihai Dusmanu et al, D2-Net: A Trainable CNN for Joint Description and Detection of Local Features, CVPR 2019, 10 pages.

Kristan Matej et al, The Sixth Visual Object Tracking VOT2018 Cha 11 enge Results, Jan. 23, 2019 (Jan. 23, 2019), Robocup 2008: Robocup 2008: Robot Soccer World Cup XII; [Lecture Notes in Computer Sci ence; Lect. Notes Computer], Springer International Publishing, Cham, XP047501058, 53 pages.

Daniel E. Worrall et al, Deep Scale-spaces: Equivariance Over Scale, arXiv:1905.11697v1 [cs.LG] May 28, 2019, 17 pages.

Hei Law et al, CornerNet: Detecting Objects as Paired Keypoints, arxiv. org, Cornell University Library, 201 Olin Library Cornell University Ithaca, NY 14853, Aug. 3, 2018 (Aug. 3, 2018), XP081263508, 14 pages.

David G. Lowe, Distinctive Image Features from Scale-Invariant Keypoints, Accepted for publication in the International Journal of Computer Vision, 2004, 28 pages.

Vassileios Balntas et al, HPatches: A benchmark and evaluation of handcrafted and learned local descriptors, arXiv:1704.05939v1 [cs.CV] Apr. 19, 2017, 10 pages.

Axel Barroso Laguna et al., Key.Net: Keypoint Detection by Handcrafted and Learned CNN Filters, arXiv:1904.00889v2 [cs.CV] Apr. 2, 2019, 9 pages.

Yurun Tian et al, L2-Net: Deep Learning of Discriminative Patch Descriptor in Euclidean Space, 2017 IEEE Conference on Computer Vision and Pattern Recognition (CVPR), 9 pages.

Matthew Schultz et al, Learning a Distance Metric from Relative Comparisons, Part of Advances in Neural Information Processing Systems 16 (NIPS 2003), 8 pages.

Yuki Ono et al, LF-Net: Learning Local Features from Images, 32nd Conference on Neural Information Processing Systems (NeurIPS 2018), Montr al, Canada, 11 pages.

Kwang Moo Yi et al., LIFT: Learned Invariant Feature Transform, arXiv:1603.09114v2 [cs.CV] Jul. 29, 2016, 16 pages.

Zhengqi Li et al, MegaDepth: Learning Single-View Depth Prediction from Internet Photos, CVPR, 2018, 10 pages.

Hany Farid et al, Optimally rotation-equivariant directional derivative kernels, Presented at: 7th Int'l Conf Computer Analysis of Images and Patterns, Kiel, Germany. Sep. 10-12, 1997, 8 pages.

Jerome Revaud et al, R2D2: Repeatable and Reliable Detector and Descriptor, arXiv:1906.06195v2 [cs.CV] Jun. 17, 2019, 12 pages.

Daniel DeTone et al, SuperPoint: Self-Supervised Interest Point Detection and Description, Camera-ready version for CVPR 2018 Deep Learning for Visual SLAM Workshop (DL4VSLAM2018), 13 pages.

International Search Report and Written Opinion for Application No. PCT/EP2019/078859 dated Jul. 3, 2020, 13 pages.

* cited by examiner

Figure 12 (a) SIFT   Figure 12(b) D2-Net   Figure 12(c) Ours

FEATURE DETECTOR AND DESCRIPTOR

CROSS-REFERENCE TO RELATED APPLICATIONS

This application is a continuation of International Application No. PCT/EP2019/078859, filed on Oct. 23, 2019, the disclosure of which is hereby incorporated by reference in its entirety.

TECHNICAL FIELD

The present disclosure relates to image processing, in particular to extracting features from an input image.

BACKGROUND

Feature extraction is a pivotal step in many computer vision applications and helps 2D and 3D vision systems build reliable backbones that guarantee robust and effective applications to provide a satisfying user experience. At its core, the problem of feature extraction is to identify meaningful locations within the scene that can be easily localized with a high accuracy from different viewpoints while being distinguishable in their appearance from other candidates.

Modern 3D vision pipelines for simultaneous localization and mapping (SLAM), augmented reality and photogrammetry all rely on powerful feature extraction stages to work seamlessly. Furthermore, 2D vision applications that require geometric understanding of the scene or alignment of images such as Panoramic Photo Stitching require reliable feature extractors. Once characteristic regions and their mathematical descriptors have been extracted, they can be matched not only in order to infer the 2D relationships among images, but also to use the 2D relationships to generate 3D reconstructions and depth maps from images, and many more 3D applications.

A standard feature extraction pipeline typically comprises a detector to detect characteristic regions, known as keypoints or patches, in images, and a consecutive descriptor to mathematically describe the region around the keypoint. Keypoints and descriptors are generated to describe these locations, even though the images are under different geometric or photometric transformations.

The task is therefore twofold. First, a reasonable amount of reliable points within a specific region of interest needs to be found; this can be a part of an image or an entire image. Second, a function is sought to robustly extract a meaningful representation of the keypoint with the help of information from the local vicinity around it.

Figure 1:
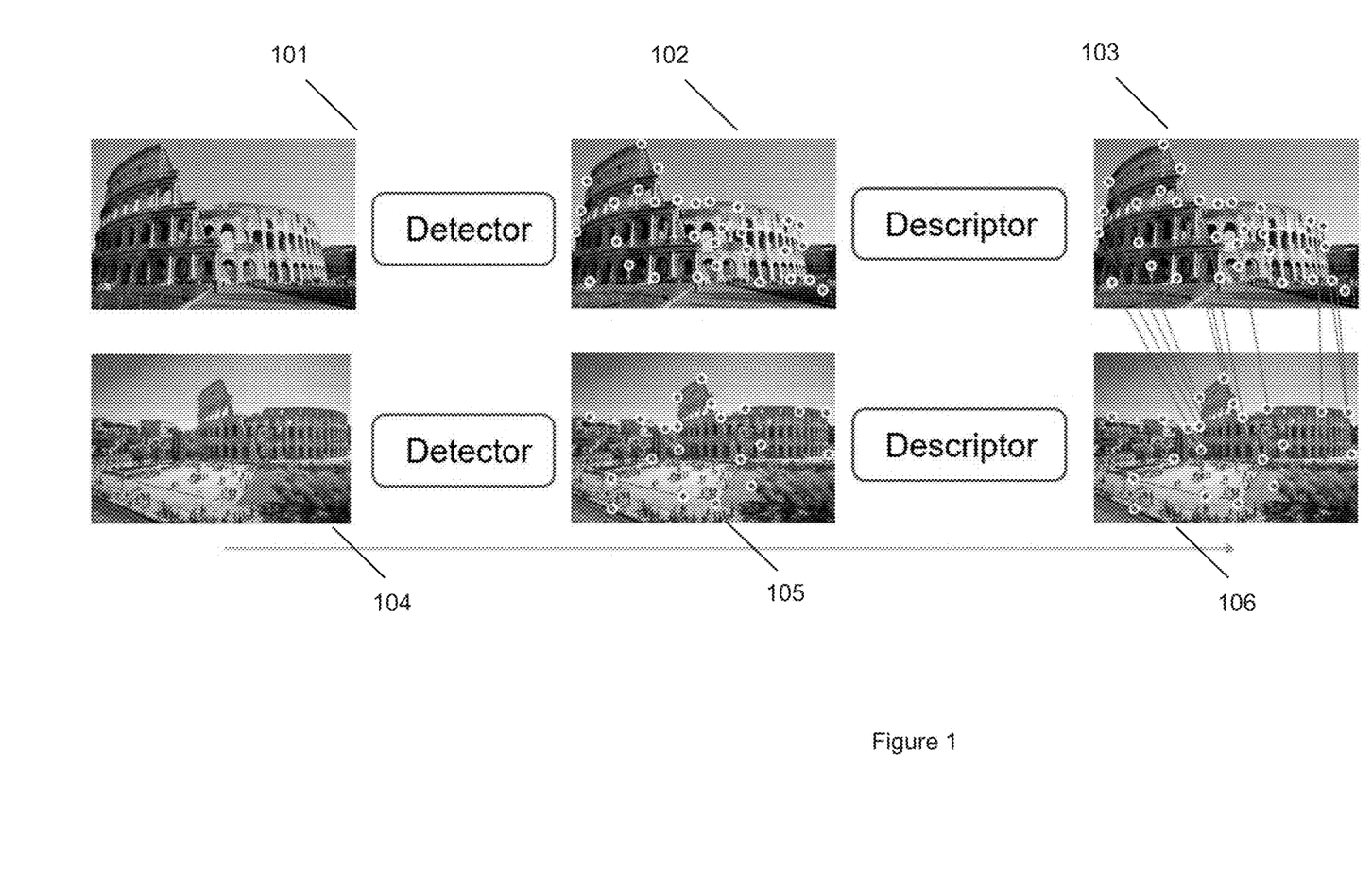
FIG. 1 illustrates an example conventional detector-descriptor pipeline.

FIG. 1 shows an example of a detector-descriptor pipeline and illustrates the process with two example images from different viewpoints, as shown at 101 and 104. The photographic images are formed from an RBG camera. In a first stage, a detector detects specific keypoints. Their locations are shown by circles in the images at 102 and 105. These are locations that have been calculated from the detector to be at distinguishable points within the input images. They are further processed by a descriptor that assigns a multi-dimensional value to each individual keypoint and its neighbourhood in descriptor space. Comparing the difference in descriptor space allows for a matching of the keypoints. In this example, these descriptions are used to match corresponding areas within the two images in case that the descriptions are close to each other given a metric in descriptor space. The points with the closest description below a specified threshold are matched. The matches are illustrated with a connecting line between the images at 103 and 106.

Since the output of the detector is the input of the descriptor, the two tasks are mutually dependent. Most current state-of-the-art approaches focus on formulating a solution to either one of the two tasks, or describe the whole image pixel by pixel.

Traditionally, detectors and descriptors are based on extracting hand-crafted features that are applied in efficient pipelines.

Multiple manually designed pipelines have been introduced to tackle the discussed problem. Most of these methods make use of approximations to differential operators acting as filters on the image to produce gradient images and Hessians. While edge and corner detectors can be efficiently designed as filters, blob detectors usually analyse smoothed versions of the image with simple differential operations (e.g. Laplacian of Gaussian, Difference of Gaussian, determinant of Hessian). In order for the algorithm to be invariant to photometric transforms and geometric changes such as differences in scale, rotation and more complex mappings, these filters are used within elaborate pipelines to detect keypoints and describe their neighbourhoods.

One example of this class of algorithms is SIFT (scale invariant feature transform) as described in David Lowe, "Distinctive image features from scale-invariant keypoints", International Journal of Computer Vision (IJCV) 2004 and U.S. Pat. No. 6,711,293 B1. The SIFT pipeline is a hand-crafted method that infers orientation, position and description from a scale space volume. It describes the found SIFT-points with a 128-dimensional vector. For localization, a difference of Gaussian is used, while the scale invariance is achieved with a scale-space pyramid and the rotation invariance is tackled with orientation histograms.

While known methods have proven to be both efficient and accurate in many applications, they are designed with the idea in mind to be invariant to a specific set of transformations and mainly driven by observations how the human eye differentiates certain key locations. Moreover, methods such as SIFT can only cope with local geometric distortions to a limited extent. Overall, the plethora of possible variance in images is not specifically analysed due to the limited modelling capabilities.

Data-driven approaches inherently analyse the variance of the images fed to them during parameter optimization. Doing so in a framework of convolutional neural networks, the function approximator can be optimized for the ideal kernels that best suit the data present. Most approaches either focus on learning a detector or learning a descriptor.

It is desirable to develop an image processing system that overcomes the above problems.

SUMMARY

According to one aspect there is provided an image processor comprising a plurality of modules, the plurality of modules comprising a first module and a second module, wherein the image processor is configured to receive an input image and output a plurality of mathematical descriptors for characteristic regions of the input image, wherein: the first module is configured to implement a first trained artificial intelligence model to detect a set of characteristic regions in the input image; and the second module is configured to implement a second trained artificial intelligence model to determine a mathematical descriptor for each of said set of characteristic regions; wherein the first and second trained artificial intelligence models are collectively trained end to end.

The input to the second module may comprise the output of the first module. The image processor may therefore be implemented in an image processing pipeline.

The first module may be configured to detect characteristic regions of the input image by combining hand-crafted and learned features. The second module may be configured to determine the mathematical descriptors of said characteristic regions by combining hand-crafted and learned features. This may promote robustness against photometric and geometric changes. The hybrid formulation exploits the hand-crafted features as prior knowledge for robustness, whilst also being versatile through the learning phase. In this way, it is possible to compute meaningful representations without the need to extract the robustness from the data alone, thus allowing for a computationally efficient implementation.

At least one of the first and second modules may be configured to aggregate data from differently sized regions of the input image. This may allow features to be extracted from the image which possess different context depending on the resolution of the input image.

The input image may be an RGB image. This may allow the image processor to be used by a device with a camera, such as a smartphone.

The characteristic regions may be edges and/or corners of the input image. This may allow the image processor to be used in computer vision applications.

According to a second aspect there is provided a method for implementation at an image processor comprising a plurality of modules, the plurality of modules comprising a first module and a second module, wherein the image processor is configured to receive an input image and output a plurality of mathematical descriptors for characteristic regions of the input image, the method comprising: implementing a first trained artificial intelligence model at the first module to detect a set of characteristic regions in the input image; and implementing a second trained artificial intelligence model at the second module to determine a mathematical descriptor for each of said set of characteristic regions; wherein the first and second trained artificial intelligence models are collectively trained end to end.

According to a third aspect there is provided a method for training a machine learning system for implementation at an image processor, the system comprising a first module and a second module, the first module implementing a first trained artificial intelligence model for detecting a set of characteristic regions in an input image and the second module implementing a second trained artificial intelligence model configured for determining a mathematical descriptor for each of said set of characteristic regions; the method comprising training the first and second artificial intelligence models collectively end to end.

The method may comprise mutually optimising a function of the first trained artificial intelligence model and a function of the second trained artificial intelligence model. This may result in improved performance.

The method may comprise training the second artificial intelligence model in dependence on the output of a training stage of the first artificial intelligence model. The method may comprise subsequently training the first artificial intelligence model in dependence on the output of a training stage of the second artificial intelligence model. This may allow for mutual refinement of the detector based on the descriptor, and the descriptor based on the detector.

The method may comprise alternately performing learning for the first and second trained artificial intelligence models. The method may comprise iteratively updating the parameters of the first and second trained artificial intelligence models. This may allow for continual improvement of the models during training.

The method may comprise updating the parameters of the first trained artificial intelligence model to improve a repetitiveness of the first trained artificial intelligence model. The method may comprise updating the parameters of the second trained artificial intelligence model to improve a discriminative score of the second trained artificial intelligence model. The joint training of the models may therefore allow for the detection of features that are both repeatable and discriminative.

According to a fourth aspect there is provided a machine learning system for implementation at an image processor configured to perform any of the methods described above.

BRIEF DESCRIPTION OF THE FIGURES

The present disclosure will now be described by way of example with reference to the accompanying drawings. In the drawings.

DETAILED DESCRIPTION OF EMBODIMENTS

The image processor described herein formulates the problem of feature extraction from images as a composition of two functions h (detector) and d (descriptor). These functions can both fuse hand-crafted features and intrinsically learn representations to combine the outcomes of both approaches. The two functions are approximated with a general function approximator. Conveniently, this may be a convolutional neural network that jointly optimizes the mappings with specific input data, while aggregating context at different hierarchical levels.

Figure 2:
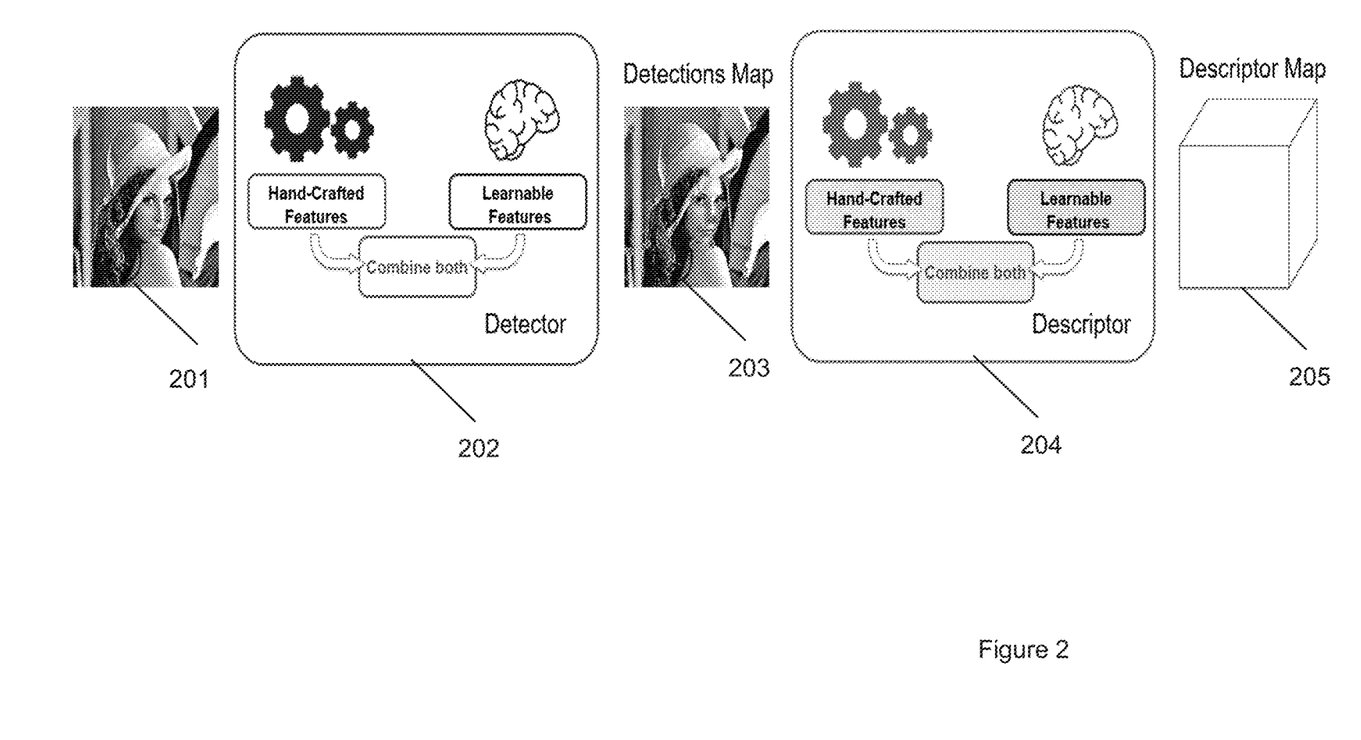
FIG. 2 illustrates an example hybrid detector-descriptor pipeline.

FIG. 2 shows an overview of an example of a hybrid image processing pipeline. An input image 201 is fed to the detector stage 202, which combines both hand-crafted and learnable features (described in more detail below), to detect distinguishable keypoints which are illustrated with circular shapes in the detection map 203. A consecutive description stage 204 also combines hand-crafted features with learned representations to output a descriptor map 205, which describes the keypoint locations. The description can either be sparse (at the keypoint location) or dense (at all pixels).

Traditionally, the detector and the descriptor are two entities that are treated and trained separately. As will be described in the following, the detector and descriptor architecture described herein can be trained by mutually alternating the training of the two component modules.

Detector and descriptor approaches generally have two distinct objectives. While the detector favours repeatable areas that can consistently (or, in a preferred case, always) be detected, for example from images taken from different viewpoints, the descriptor favours discriminative areas that exhibit unique representations that ultimately lead to matches of these parts in an image matching task.

For example, for input images of the same object taken from different viewpoints, the repetitiveness of the model reflects the proportion of instances that the same keypoints can be detected in the images from the different views. The discriminative score of the model reflects the degree to which dissimilar keypoints can be distinguished. A high discriminative score indicates that the model can differentiate dissimilar keypoints.

Often, these two objectives are opposed. A highly textured surface with a repeatable pattern for example would be beneficial for detection, whilst the descriptor may have difficulties distinguishing parts detected within every instance of the repeated pattern. For this reason, a joint training of the individual parts within the feature extraction pipeline (i.e. joint training of the detector and the descriptor) is beneficial.

Figure 3:
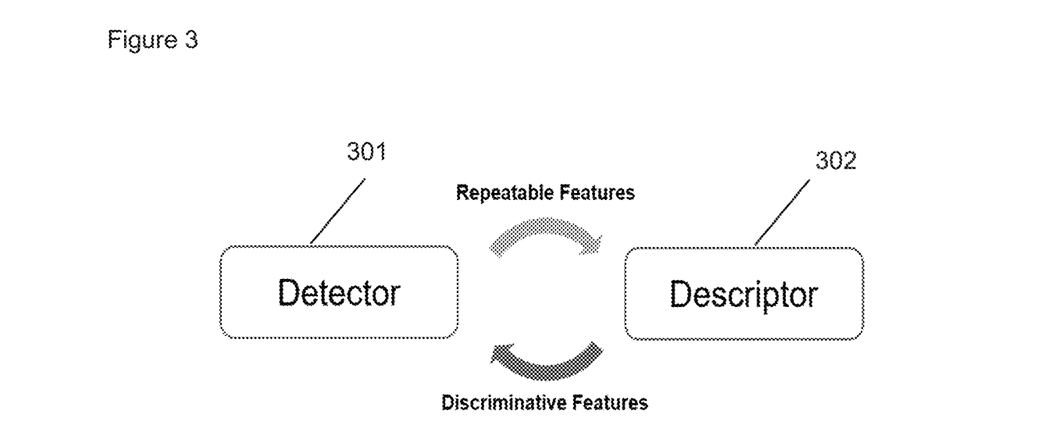
FIG. 3 illustrates an example bi-directional training of a detector and descriptor.

FIG. 3 shows an overview of this bi-directional mutual training process of the detector 301 and the descriptor 302. An optimization step for the detector to improve the repetitiveness of a keypoint is followed by an update of the description stage which emphasizes the feature to be discriminative. This joint training may allow for the detection of features that are both repeatable and discriminative. During training of the detector 301, an update increases the repeatability of a feature. The update is followed by an update of the descriptor stage 302 that improves on the discriminative score of the features (i.e. the ability of the features to be differentiated from one another). Following the arrows shown in FIG. 3, the training is performed in alternating steps between the detector and the descriptor. The image processor is therefore configured to train the descriptor in dependence on the output of a training stage of the detector. The image processor can also train the detector in dependence on the output of a training stage of the descriptor. The image processor may subsequently train the detector in dependence on the output of a training stage of the descriptor and/or vice versa. The image processor can therefore alternately (i.e. one after the other and preferably repeatedly) perform learning for the detector and the descriptor and can iteratively update the parameters of the models to be implemented by these modules. Therefore, there is mutual refinement of the detector based on the descriptor, and the descriptor based on the detector.

In terms of function approximations, the feature extraction pipeline may be viewed as a composition of two functions: h (detector) and d (descriptor). Training a neural network pipeline including a detector and a descriptor can be viewed as an optimization problem in a function space such that the composite function of applying descriptor after detector is retrieved. Traditionally, these two problems are treated individually from one another. The outcome of the overall pipeline depends on both parts. The mutual update of the functions may improve the composition of these functions, as will be described in more detail below.

The detector function h assigns to each pixel location within the image I a score s from the score range S=[0,1]. One can think of h as a function comprising the identity and a score function that retrieves the likelihood of a given pixel p to be a keypoint, say h(p)=(p,s) with s$\gg$0. At the same time, points that are not reliably detected will be assigned to low scores.

The descriptor can be seen as a function d that assigns a multi-dimensional value to a given pixel within the image that is supposed to describe the image content of this part both accurately while being robust to image transformations. The multi-dimensional value assigned to a specific pixel may be close in the hypercube Cn with C=[-1,1] if the pixel regions correspond to the same world points while the descriptions may differ if this is not the case.

In order to approximate both of these functions, h and d, the approach described herein can learn an embedding that assigns a pseudo metric to the descriptor such that the system is able to distinguish dissimilar points well while being consistent for points that arise from different projections of the same world point. In this implementation metric learning may be used, and the Mahalanobis distance between points through a Triplet loss utilized (see Schultz, Joachims, "Learning a distance metric from relative comparisons", Advances in neural information processing systems (NeurIPS), 2004). The descriptor cj of a candidate patch compared to an anchor patch ci is pushed further away in the Euclidean embedding space Cn for points that are dissimilar while their values are pulled closer together if the anchor and the candidate are similar. In practice, we use n=128.

The training may be performed jointly in the sense that an optimization step to optimize for the descriptor is done after an optimization step for the detector, similarly to an expectation-maximization optimization scheme. Stochastic gradient descent may be used to optimize the two functions individually with the common loss function d(h(ci)) for the composition of both. The different losses $L_{det}$ and $L_{desc}$ for the detector and the descriptor respectively may be used for the mutual updates, as described below, or $L_{desc}$ can be used with alternating gradient steps in the direction given by the weights of either d or h.

The individual losses can be written as:

$$L_{det} = \|d(h(c_i)) - d(h(c_j))\|_p \qquad (1)$$

for the patches $c_i$ and $c_j$ to update the detector based on the description distance and:

$$L_{desc} = \max\{\|d(h(c_i)) - d(h(c_k))\|_p^2 - \|d(h(c_i)) - d(h(c_j))\|_p^2 - a, 0\} \qquad (2)$$

with anchor patch $c_i$, positive sample $c_j$, negative sample $c_k$ and margin a between positive and negative pairs for the descriptor to learn a meaningful pseudo metric in the embedding space. In practice one can use p=2 or a robust Huber-loss. The networks described above can be trained with these losses until convergence.

Formulation of the losses are therefore based on repeatability and discriminativeness, for example implemented with metric learning, for the detector and the descriptor respectively.

Figure 4:
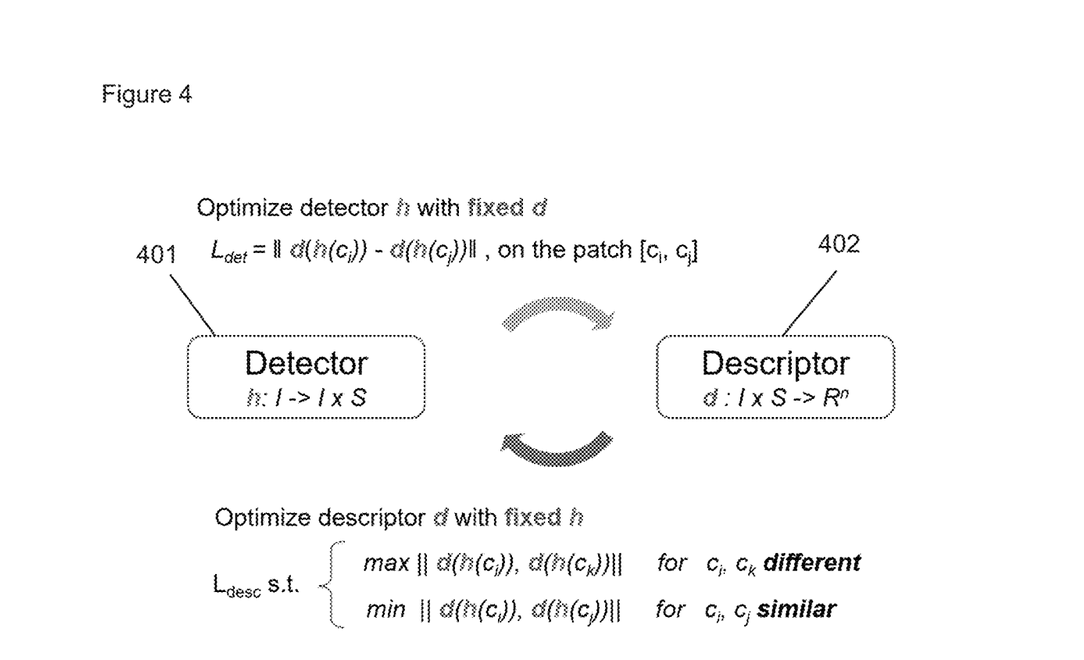
FIG. 4 illustrates a further example of bi-directional training of the detector and descriptor.

FIG. 4 illustrates the bi-directional training of detector 401 and descriptor 402 with functions h and d respectively. As described above, descriptor and detector training is performed jointly. One step during the optimization of the detector h with stochastic gradient descent is performed with a fixed detector approximation d. In this example, the gradients are calculated with respect to the common composite loss function $L_{det}$ (Equation (1)). A step driven by the descriptor is performed with respect to the metric learning of a Mahalanobis pseudo metric with a triplet loss $L_{desc}$ (Equation (2)) such that similar points are assigned to similar descriptors, while the points corresponding to dissimilar regions are pushed away in descriptor space (bottom). The process is repeated iteratively with mutual updates of detector and descriptor until convergence.

The function approximation for the architecture may therefore be formulated as a composition, with joint and/or bi-directional training of the detector and descriptor.

There is therefore correlation of the detector and the descriptor not only on inference but also during training.

As described above, the detector stage may combine both hand-crafted and learnable features. Hand-crafted refers to features derived using information present in the input image itself. For example, a basic edge detector algorithm may detect characteristic regions such as edges by detecting areas where the image intensity changes suddenly. Learned features refers to features that can be learned from the input image data, i.e. that are automatically obtained using a machine learning algorithm. For example, a convolutional network may learn characteristic regions from the input image data because they emerge from the data.

For the hybrid extraction of the detector, the architecture and implementation described by Key.Net (Axel Barroso et al., "Key.Net: Keypoint Detection by Handcrafted and Learned CNN Filters", International Conference on Computer Vision (ICCV) 2019) can be applied that combines hand-crafted with learned features to extract keypoints from the input image.

Figure 5:
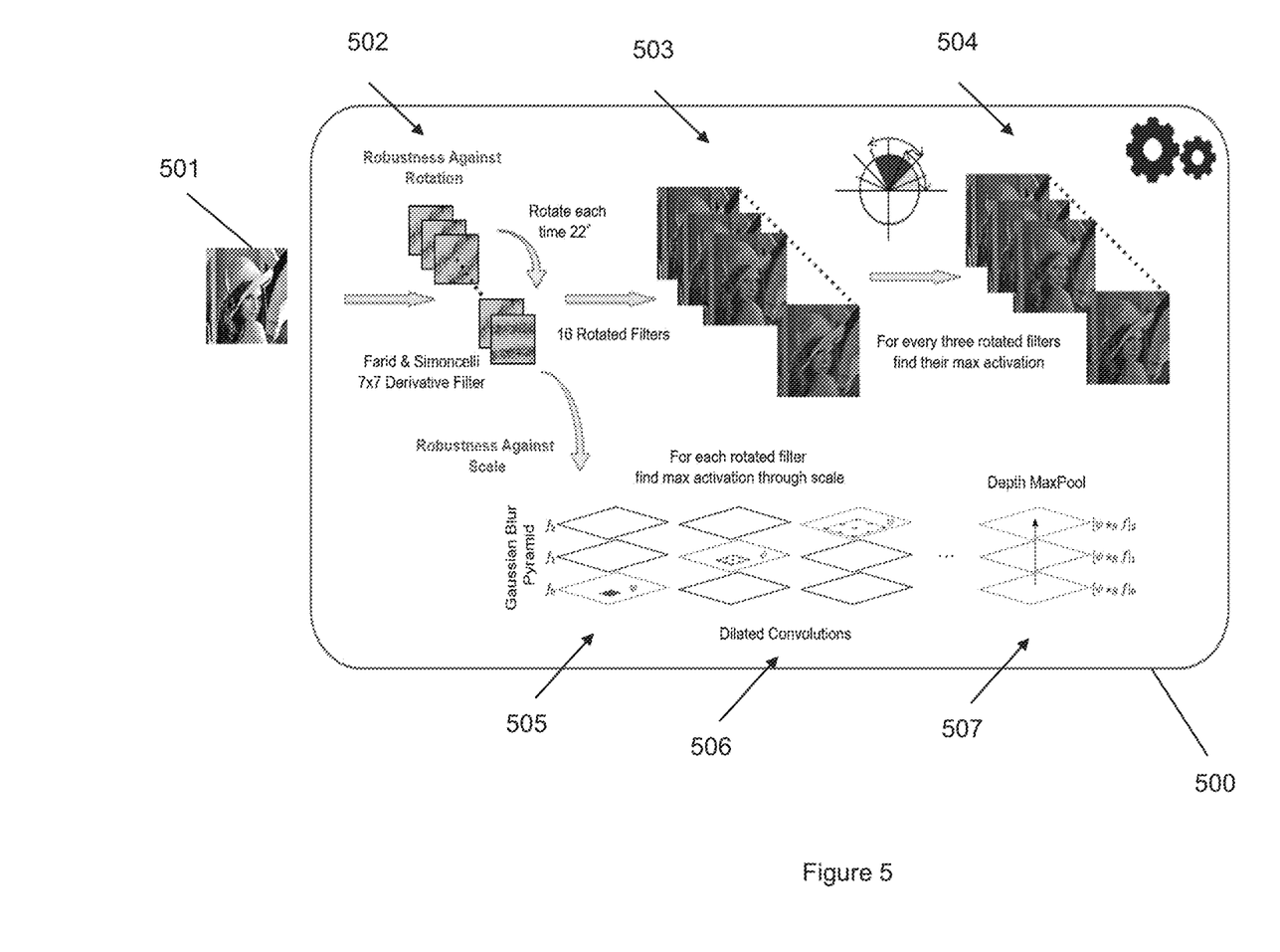
FIG. 5 illustrates an example hand-crafted feature extraction for the descriptor.

For the descriptor, an example of the hand-crafted feature extraction stage is illustrated in FIG. 5. In this example, the methods described in Farid, Simoncelli, "Optimally rotation-equivariant directional derivative kernels", International Conference on Computer Analysis of Images and Patterns (ICIP) 1997, were used to extract optimally rotation-equivariant directional derivative kernels.

An image 501 is processed by a set of discretized differential operators applied as filters to the image as proposed by Farid, Simoncelli, "Optimally rotation-equivariant directional derivative kernels", International Conference on Computer Analysis of Images and Patterns (ICIP) 1997, as shown at 502. These filters are rotated in steps of 22° to produce an output that is robust against 2D image rotations. A set of discretized differential operators (namely $\partial_x, \partial_y, \partial_{xx}, \partial_{yy}, \partial_{xy}$) were rotated in steps of 22° and applied to the image individually. This step promotes robustness against rotation of the image content.

The 16 rotated filters are then applied to the image as shown at 503, and the maximum activations for every three rotated filters are selected at 504.

In order to be robust against scale changes, a Gaussian blur pyramid may be applied where dilated convolutions look at different context for each rotated filter to find also the maximal activation across scale dimension.

As shown at 505, a Gaussian blur pyramid of the image is created, which is processed with dilated convolutions with increasing stride, shown at 506, to gather context from increasingly larger neighbourhoods. The information is condensed with a max-pool layer across the spatial dimension (see Worrall, Welling. Deep Scale-spaces: Equivariance Over Scale. arXiv 2019), shown at 507.

During training, a whitening transformation across the batch may be applied to features to transform the feature statistics towards an identity covariance. In this way, the features are represented as uncorrelated signals with variance of one within a hypersphere.

Figure 6:
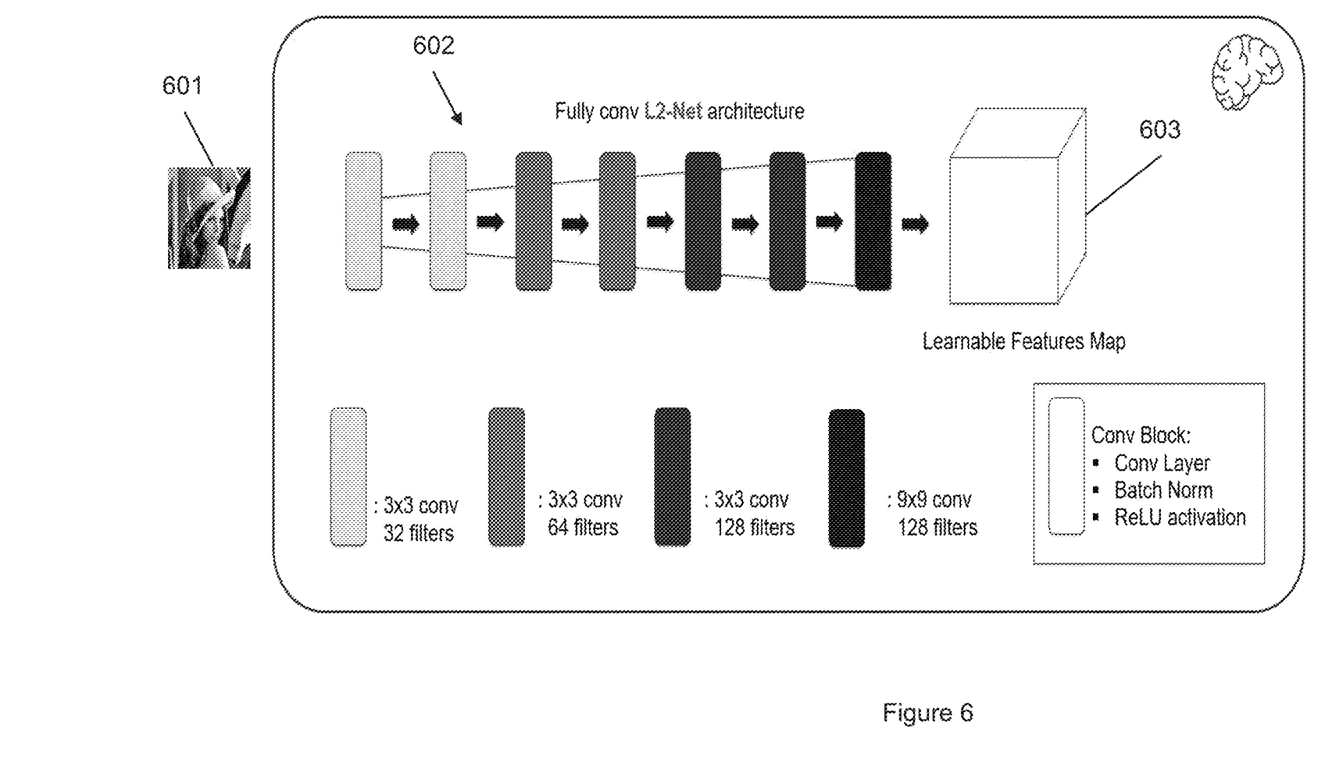
FIG. 6 illustrates example learned feature extraction for the descriptor.

The learned feature extraction for the descriptor is illustrated in FIG. 6. In this example, the learned features used in the architecture are extracted with the architecture proposed in Tian et al., "L2-net: Deep learning of discriminative patch descriptor in euclidean space", Proceedings of the IEEE Conference on Computer Vision and Pattern Recognition, 2017. L2-Net is a fully convolutional neural network whose filter amount increases hierarchically with the depth. The network applies individual convolutional blocks that use a convolutional layer followed by batch normalization and a ReLU activation.

An image 601 is processed by the learned feature extraction stage L2-Net. Seven convolutional blocks with hierarchically increasing filter sets are appended in the architecture, shown generally at 602, to extract a feature map 603. The individual blocks comprise a convolutional layer on which batch normalization and an activation in the form of a ReLU is applied. While the first filters are 3×3 convolutions with 32 learned filters, the last layer comprises a 9×9 convolution with 128 learned filters.

There is therefore a combination of hand-crafted and learnable features within the architecture. A similar approach is applied for the detector to combine hand-crafted and learned features. This promotes robustness against photometric and geometric changes by design.

The image processor may also perform hierarchical multi-context aggregation.

The first layer filters of a convolutional neural network (CNN) applied to an image have only limited spatial perception on the context around the point where the filter is applied. While fusion of information within deeper layers can combine data from different spatial locations, the convolution operation itself is translation invariant. This means that applying a convolutional kernel to an image does not include information on where it is applied within that image. While this is an advantageous aspect when it comes to training of neural networks, because only a limited set of filters can have trained weights, it can be at the same time problematic when spatial context should be aggregated within early stages of a CNN. This may be overcome by using a hierarchical context aggregation scheme.

Figure 7:
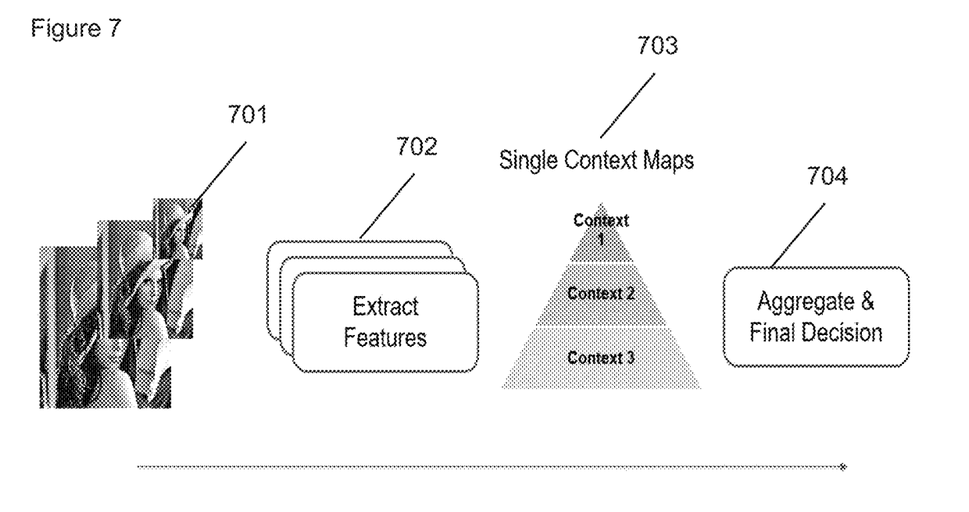
FIG. 7 illustrates example hierarchical context aggregation.

To realize aggregation from different spatial locations, the architecture may advantageously include filters that operate on local to global perceptions such that the spatially nearby information can be included at the same time with information further away. For this, a spatial sampling pyramid can be utilized with different image resolutions on which the filters to extract the features are applied individually. This multi-context feature extraction takes place both in the detector and the descriptor, such that the result is more robust against perturbation related to scale variations within the image, while aggregating the information across different neighbourhood sizes. This is illustrated in FIG. 7. A spatial pyramid of downsampled images with decreasing resolution is generated, as shown at 701. A feature extraction stage 702 operates on each of the images individually to retrieve information that includes different neighbourhood sizes where the perceptive field of early-stage filters includes different contexts within the image. The extracted features possess different context depending on the resolution of the input image, as shown at 703. An information aggregation stage combines the information from these context maps to conclude a final decision, as shown at 704.

Figure 8:
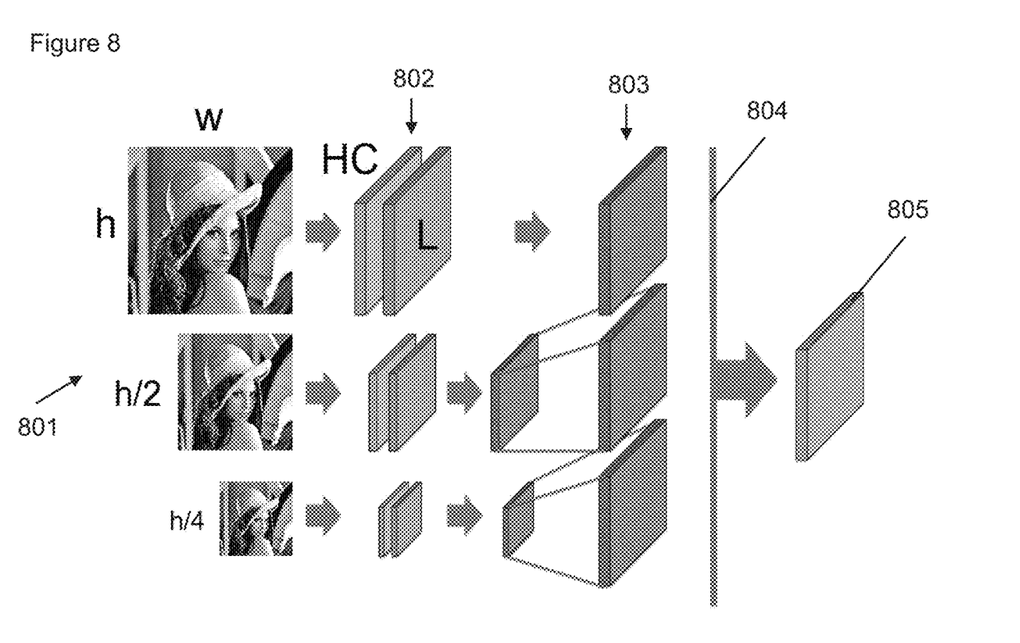
FIG. 8 illustrates an example of hybrid hierarchical context aggregation.

A scale space approach similar to the one described above with reference to FIG. 7 may be used to fuse the features from both a hand-crafted pipeline (HF) and a learning stage (L). This is illustrated in FIG. 8. In this hybrid hierarchical context aggregation, a spatial image pyramid extracts the individual hand-crafted and learned features on three different layers to increase the spatial context of the applied filter to further neighbourhoods on lower scales. The calculated feature layers on the resized resolutions are upsampled to full resolution before they are put into a neural network that learns filter weights across the scale dimension to eventually output a combined feature map with aggregated information.

A spatial image pyramid is constructed with three levels such that the resolution decreases to from 1/1 to ½ and ¼, as shown generally at 801. The extracted hand-crafted (HC) and learned (L) features respect increasing neighbourhood sizes for decreasing resolutions and are stored on different resolutions with a feature dimension of 128, as shown generally at 802. The low resolution feature maps are upsampled with bilinear upsampling across the spatial domain to create three feature maps at the same resolution, as shown at 803. A set of filters 804 is learned to combine the feature maps across the scale dimension. The ultimate feature map 805 possesses the information aggregated from the different contexts that arise as a result of the previous steps.

The image processor may therefore perform feature extraction on multiple contexts and an aggregation of them for the detector and the descriptor. The detector and descriptor can therefore advantageously aggregate data from differently sized regions of the input image around the characteristic regions. These different regions may be increasingly sized neighbourhoods that may have hierarchically increasing vicinity around the characteristic region.

Figure 9:
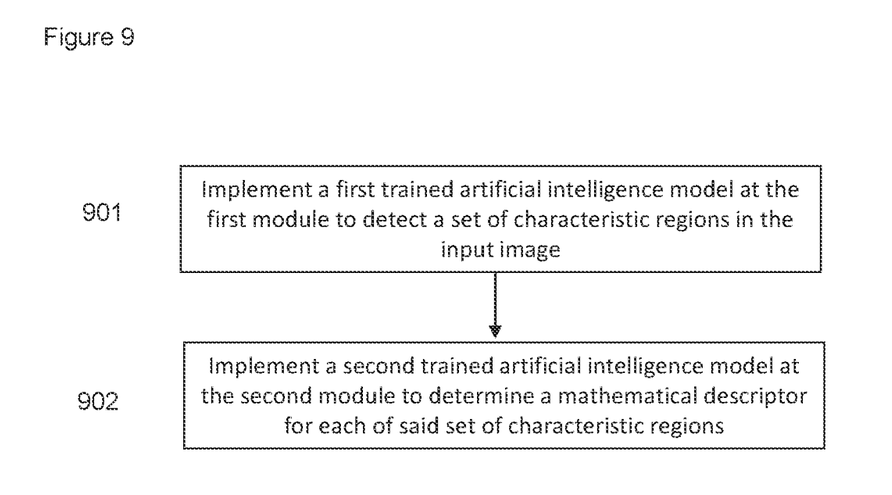
FIG. 9 shows an example method for implementation at an image processing system.

FIG. 9 summarises a method for implementation at an image processor. As described above, the image processor comprises a plurality of modules, the plurality of modules comprising a first module and a second module, wherein the image processor is configured to receive an input image and output a plurality of mathematical descriptors for characteristic regions of the input image. At step 901, the method comprises implementing a first trained artificial intelligence model at the first module to detect characteristic regions in the input image. At step 902, the method comprises implementing a second trained artificial intelligence model at the second module to determine the mathematical descriptors of said characteristic regions. As described above, the first and second trained artificial intelligence models are collectively trained end to end.

Figure 10:
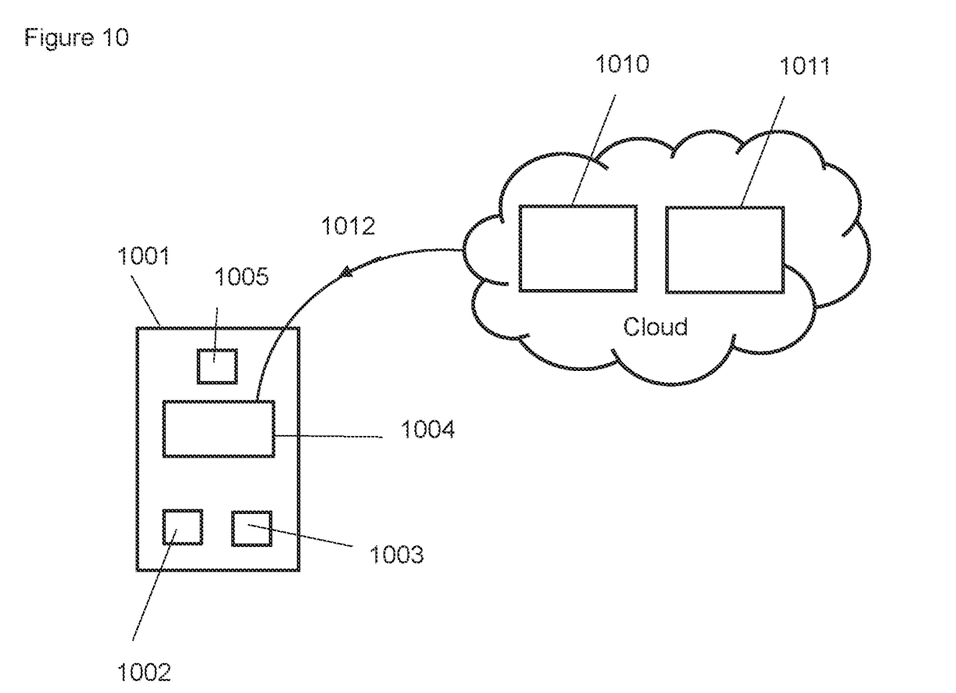
FIG. 10 shows an example camera for implementing the image processor described herein.

FIG. 10 shows an example of a camera configured to implement the image processor to process images taken by an image sensor 1002 in the camera 1001. Such a camera 1001 typically includes some onboard processing capability. This could be provided by the processor 1004. The processor 1004 could also be used for the essential functions of the device. The camera typically also comprises a memory 1003.

The transceiver 1005 is capable of communicating over a network with other entities 1010, 1011. Those entities may be physically remote from the camera 1001. The network may be a publicly accessible network such as the internet. The entities 1010, 1011 may be based in the cloud. In one example, entity 1010 is a computing entity and entity 1011 is a command and control entity. These entities are logical entities. In practice they may each be provided by one or more physical devices such as servers and data stores, and the functions of two or more of the entities may be provided by a single physical device. Each physical device implementing an entity comprises a processor and a memory. The devices may also comprise a transceiver for transmitting and receiving data to and from the transceiver 1005 of camera 1001. The memory stores in a non-transient way code that is executable by the processor to implement the respective entity in the manner described herein.

The command and control entity 1011 may train the artificial intelligence models used in the system, as described above. This is typically a computationally intensive task, even though the resulting model may be efficiently described, so it may be efficient for the development of the algorithm to be performed in the cloud, where it can be anticipated that significant energy and computing resource is available. It can be anticipated that this is more efficient than forming such a model at a typical camera.

In one implementation, once the deep learning algorithms have been developed in the cloud, the command and control entity can automatically form a corresponding model and cause it to be transmitted to the relevant camera device. In this example, the system is implemented at the camera 1001 by processor 1004.

In another possible implementation, an image may be captured by the camera sensor 1002 and the image data may be sent by the transceiver 1005 to the cloud for processing in the system. The resulting target image could then be sent back to the camera 1001, as shown at 1012 in FIG. 10.

Therefore, the method may be deployed in multiple ways, for example in the cloud, on the device, or alternatively in dedicated hardware. As indicated above, the cloud facility could perform training to develop new algorithms or refine existing ones. Depending on the compute capability near to the data corpus, the training could either be undertaken close to the source data, or could be undertaken in the cloud, e.g. using an inference engine. The system may also be implemented at the camera, in a dedicated piece of hardware, or in the cloud.

Figure 11:
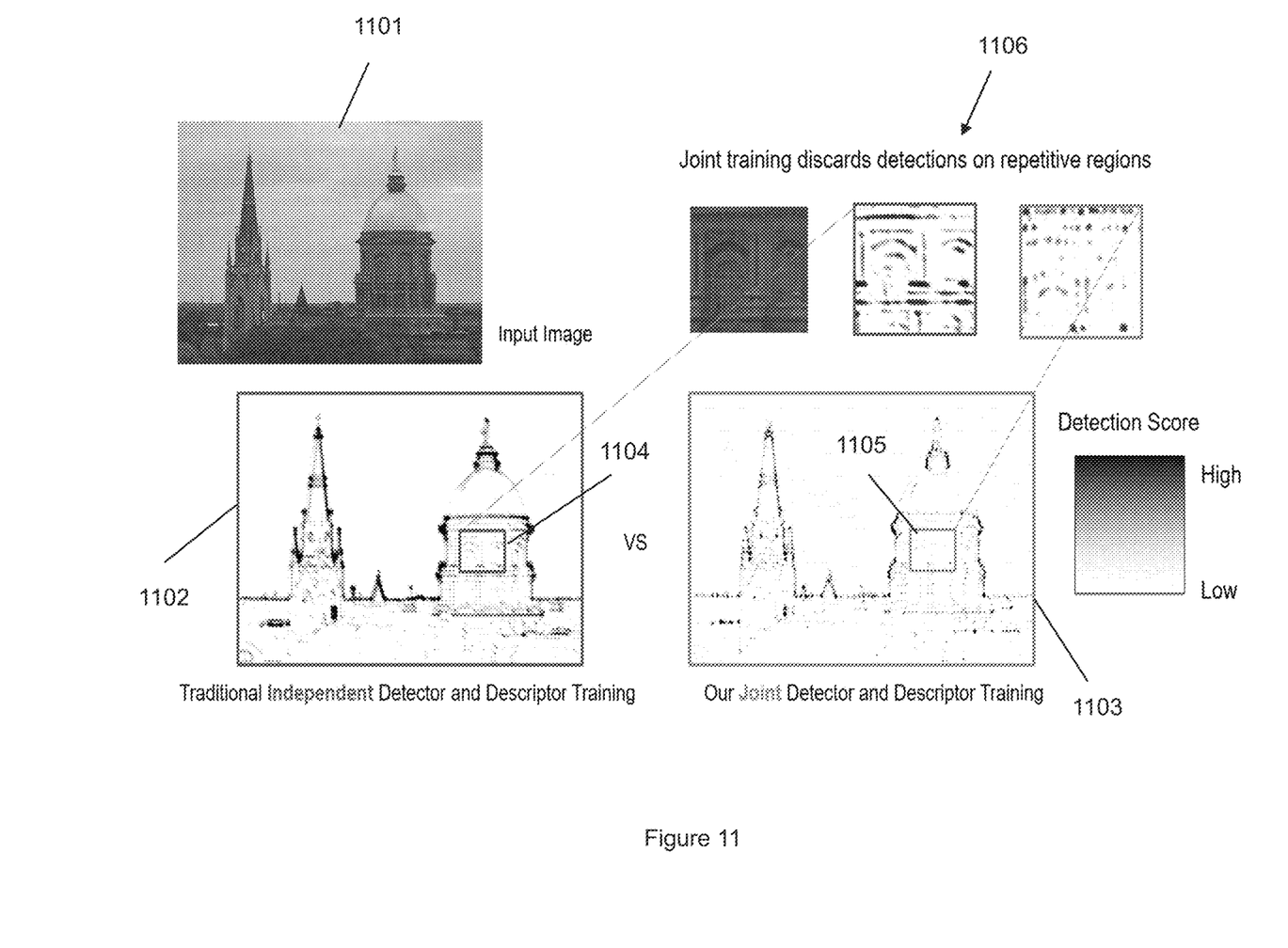
FIG. 11 illustrates example effects of bi-directional training on the outcome of keypoint scores.

The joint training described above may in some implementations have a significant effect on the outcome of both the descriptor and the detector, as shown in FIG. 11.

FIG. 11 illustrates the effect of bi-directional training on the outcome of keypoint scores. The source image 1101 is fed into a detector-descriptor-framework that has been trained twice, independently and jointly. The detector score is visualized in the lower part for the independent training, shown at 1102, and the joint training, shown at 1103, where darker values correspond to higher scores. For a section of the image, shown at 1104 and 1105 in 1102 and 1103 respectively, the two regions are shown in detail at 1106. For the joint training, the response along the edge in the upper part of the zoom possesses a high response, even though the structure is repetitive. This response reduces to the corner points such that the keypoint becomes more localized and thus more reliable when it comes to consecutive tasks, such as matching.

While in a classical (e.g., independent) training, high scores are assigned to characteristic points independent of their repetitiveness within the image, the discriminativeness of joint training produces well-distinguishable regions. In the image shown in FIG. 11, this can be observed by looking at high gradient areas that have a high response in the independent training while pixels along image edges are reduced to characteristic structures at the corner points using joint detector descriptor training.

Figure 12:
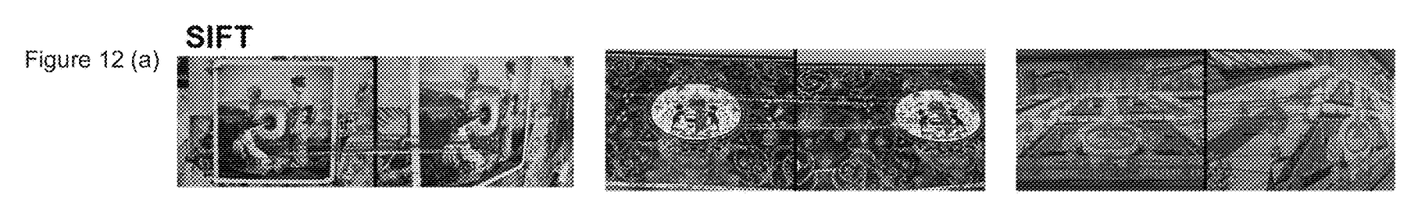
FIGS. 12(a)-(c) show an example qualitative comparison of different detector-descriptor pipelines compared for feature matching.
Figure 12B:
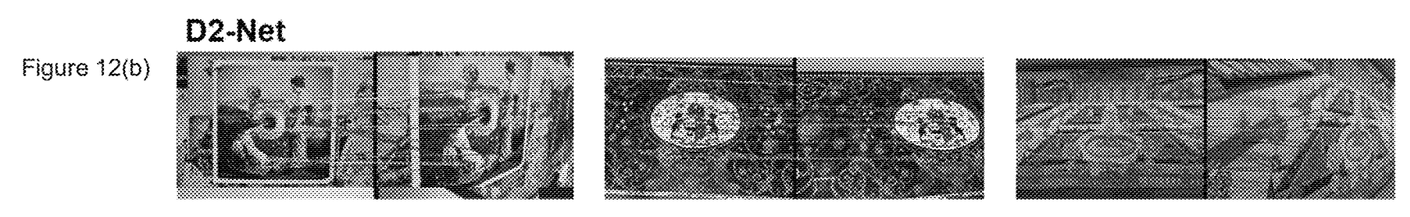
Figure 12C:
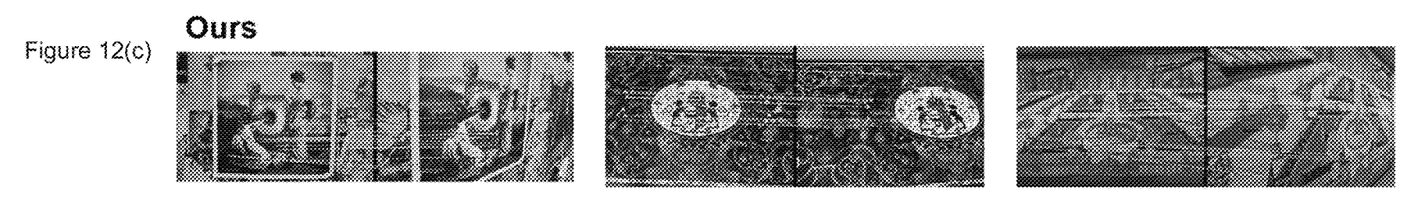

FIGS. 12(a)-(c) show a comparison of the results for a feature matching task where closest descriptors are connected for keypoints in an image from two different views using the pipeline described herein and prior art methods.

The keypoints and individual descriptors for a set of images were calculated with SIFT in FIG. 12(a), D2-Net (D2-Net: A Trainable CNN for Joint Description and Detection of Local Features, Proceedings of the IEEE Conference on Computer Vision and Pattern Recognition CVPR 2019) in FIG. 12(b) and the pipeline as described above in FIG. 12(c). The images show matches based on closest descriptor distance for detected keypoints for the three different methods. SIFT performs well under small viewpoint changes, but poorly for more general transformations. The neural network D2-Net is more robust to bigger viewpoint changes while it shows problems with repetitive structures. The pipeline trained jointly for detector and descriptor as described herein shows the best results for matching under drastic viewpoint changes, even if repetitive patterns are present within the scene.

The hybrid detector-descriptor architecture described herein closely entangles the dependent tasks of keypoint extraction and feature description leveraging both efficient hand-crafted pipelines and data-driven methods. In contrast to existing approaches, the approach described herein combines hand-crafted and learned features in both the detector and the descriptor, bi-directional entanglement of detector and descriptor during training and a method for hierarchical context aggregation.

The hand-crafted and learned features are extracted from the image and combined to create a final representation. While the hand-crafted features are designed to be robust against specific geometric and photometric transformations, they produce benefits also from the generalization capabilities of learning based approaches that inherently utilize data statistics. The hybrid formulation exploits the hand-crafted features as prior knowledge for robustness while being versatile through the learning phase. In this way, it is possible to compute meaningful representations without the need to extract the robustness from the data alone, thus allowing for a computationally efficient implementation. This enables the realization and execution of the pipeline on embedded devices, such as mobile phones.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

The invention claimed is:

1. An image processor, comprising:
    a processor; and
    a memory configured to store computer readable instructions that, when executed by the processor, cause the image processor to:
    receive an input image;
    output a plurality of mathematical descriptors for characteristic regions of the input image;
    implement, via a first module, a first trained artificial intelligence model to detect a set of characteristic regions in the input image; and
    implement, via a second module, a second trained artificial intelligence model to determine a mathematical descriptor for each of said set of characteristic regions,
    wherein the first and second trained artificial intelligence models are collectively trained end to end.

2. The image processor of claim 1, wherein input to the second module comprises output of the first module.

3. The image processor of claim 1, wherein the first module is configured to detect characteristic regions of the input image by combining hand-crafted features and learned features.

4. The image processor of claim 1, wherein the second module is configured to determine the mathematical descriptors of the characteristic regions by combining hand-crafted features and learned features.

5. The image processor of claim 1, wherein at least one of the first module and the second module is configured to aggregate data from differently sized regions of the input image.

6. The image processor of claim 1, wherein the input image includes an RGB image.

7. The image processor of claim 1, wherein the characteristic regions includes edges and/or corners of the input image.

8. A method for image processing, comprising:
    receiving an input image;
    outputting a plurality of mathematical descriptors for characteristic regions of the input image;
    implementing a first trained artificial intelligence model at a first module to detect a set of characteristic regions in the input image; and
    implementing a second trained artificial intelligence model at a second module to determine a mathematical descriptor for each of said set of characteristic regions, wherein;
    the first and second trained artificial intelligence models are collectively trained end to end.

9. The method of claim 8, wherein input to the second module comprises output of the first module.

10. The method of claim 8, wherein the first module is configured to detect characteristic regions of the input image by combining hand-crafted features and learned features.

11. The method of claim 8, wherein the second module is configured to determine the mathematical descriptors of said characteristic regions by combining hand-crafted features and learned features.

12. The method of claim 8, wherein at least one of the first module and the second module is configured to aggregate data from differently sized regions of the input image.

13. A method for training a machine learning system for implementation at an image processor, the method comprising:
    implementing, via a first module, a first trained artificial intelligence model for detecting a set of characteristic regions in an input image;

implementing, via a second module, a second trained artificial intelligence model configured for determining a mathematical descriptor for each of the set of characteristic regions; and training the first and second trained artificial intelligence models collectively end to end.

14. The method of claim 13, further comprising:

mutually optimising a function of the first trained artificial intelligence model and a function of the second trained artificial intelligence model.

15. The method of claim 13, further comprising:

training the second trained artificial intelligence model based on output of a training stage of the first trained artificial intelligence model.

16. The method of claim 13, further comprising:

subsequently training the first trained artificial intelligence model based on output of a training stage of the second trained artificial intelligence model.

17. The method of claim 13, further comprising:

alternately performing learning for the first and second trained artificial intelligence models.

18. The method of claim 13, further comprising:

iteratively updating the parameters of the first and second trained artificial intelligence models.

19. The method of claim 13, further comprising:

updating parameters of the first trained artificial intelligence model to improve a repetitiveness of the first trained artificial intelligence model.

20. The method of claim 13, further comprising:

updating parameters of the second trained artificial intelligence model to improve a discriminative score of the second trained artificial intelligence model.

* * * * *